(12) United States Patent
Pieschel et al.

(10) Patent No.: US 7,818,865 B2
(45) Date of Patent: Oct. 26, 2010

(54) METHOD OF MAKING A DUMPING UTILITY CART

(75) Inventors: Frank Pieschel, Apple Valley, MN (US);
Craig L. Stewart, Noblesville, IN (US);
Dennis Simpson, Minnetonka, MN (US); Jeff Skubic, Elk River, MN (US)

(73) Assignee: Tricam Industries, Inc., Eden Prairie, MN (US)

( * ) Notice: Subject to any disclaimer, the term of this patent is extended or adjusted under 35 U.S.C. 154(b) by 137 days.

(21) Appl. No.: 12/039,870

(22) Filed: Feb. 29, 2008

(65) Prior Publication Data

US 2008/0271306 A1    Nov. 6, 2008

Related U.S. Application Data

(62) Division of application No. 10/977,254, filed on Oct. 29, 2004, now Pat. No. 7,390,065, which is a division of application No. 10/395,010, filed on Mar. 21, 2003, now Pat. No. 6,851,756.

(51) Int. Cl.
*B23P 11/00* (2006.01)
*B60P 1/12* (2006.01)

(52) U.S. Cl. ............................. 29/434; 29/428; 29/469

(58) Field of Classification Search ............... 298/2, 298/11, 17 R, 17.5, 17.8, 17 T; 280/47.17, 280/47.18, 47.26; 414/482; 29/434, 469, 29/428
See application file for complete search history.

(56) References Cited

U.S. PATENT DOCUMENTS

| | | |
|---|---|---|
| 17,131 A | 2/1868 | Priest |
| 115,244 A | 5/1871 | Mason |
| 128,429 A | 6/1872 | Skeen |
| 1,659,245 A | 2/1928 | Delker |
| 2,693,389 A * | 11/1954 | Maxwell .................. 298/2 |
| 3,000,671 A | 9/1961 | Monegato |
| 3,281,186 A | 10/1966 | Davis |
| 3,833,263 A | 9/1974 | Jackson |
| 4,126,324 A | 11/1978 | Browning |
| 4,239,258 A | 12/1980 | Burris |
| 4,468,046 A | 8/1984 | Rutherford |
| 4,511,181 A | 4/1985 | Schantz |
| 4,697,976 A | 10/1987 | Godbersen |

(Continued)

FOREIGN PATENT DOCUMENTS

RU    1830013    7/1993

OTHER PUBLICATIONS

World Factory Poly Cart (4 pages).

(Continued)

*Primary Examiner*—Essama Omgba
(74) *Attorney, Agent, or Firm*—Patterson Thuente Christensen Pedersen, P.A.

(57) ABSTRACT

A method of making a dumping cart having an article retaining bed, a first set of wheels, a second set of wheels and a chassis. The first set of wheels is operably attached to the article retaining bed. The second set of wheels is operably attached to the chassis. The chassis is pivotally attached to the article retaining bed intermediate the first set of wheels and the second set of wheels.

20 Claims, 9 Drawing Sheets

U.S. PATENT DOCUMENTS

| | | | |
|---|---|---|---|
| 4,711,499 A | | 12/1987 | Fortin |
| 4,733,451 A | * | 3/1988 | Voigt ........................ 29/401.1 |
| 4,746,142 A | | 5/1988 | Davis |
| 4,758,008 A | | 7/1988 | Moddejonge |
| 4,768,806 A | | 9/1988 | Tétreault |
| 4,786,073 A | | 11/1988 | Harper |
| 4,889,390 A | | 12/1989 | Campbell |
| 4,995,129 A | | 2/1991 | Comardo |
| 5,340,134 A | | 8/1994 | Dodson |
| 5,350,030 A | | 9/1994 | Mawhinney et al. |
| 5,387,001 A | | 2/1995 | Hull et al. |
| 5,395,163 A | | 3/1995 | Mandell et al. |
| 5,439,239 A | | 8/1995 | Su |
| 5,544,944 A | | 8/1996 | Keech |
| 5,769,449 A | | 6/1998 | Keesee |
| 5,957,482 A | | 9/1999 | Shorter |
| 6,176,504 B1 | | 1/2001 | Van Mill et al. |
| 6,213,053 B1 | | 4/2001 | Lammers |
| 6,290,301 B1 | | 9/2001 | Bockman |
| 6,378,893 B1 | | 4/2002 | Jager |
| 6,511,092 B1 | | 1/2003 | Chepa |
| 6,834,882 B1 | | 12/2004 | Boyd |
| 6,851,756 B2 | | 2/2005 | Pieschel |
| 6,962,370 B2 | | 11/2005 | Simpson |
| 7,052,033 B2 | | 5/2006 | McDonell |
| 7,055,848 B1 | | 6/2006 | James |
| 7,175,205 B2 | | 2/2007 | Simpson |
| 7,390,065 B2 | * | 6/2008 | Pieschel et al. ................. 298/2 |
| 2003/0222431 A1 | | 12/2003 | Crosby et al. |
| 2005/0057020 A1 | | 3/2005 | Pieschel |
| 2006/0091646 A1 | | 5/2006 | Steins |
| 2006/0245876 A1 | * | 11/2006 | Hopkins et al. ............. 414/482 |
| 2007/0200419 A1 | * | 8/2007 | Pieschel et al. ................. 298/2 |
| 2008/0203687 A1 | * | 8/2008 | Meyers et al. ............ 280/47.18 |
| 2008/0217985 A1 | * | 9/2008 | Botha .......................... 298/11 |
| 2009/0242285 A1 | * | 10/2009 | Whetstone, Jr. ............ 180/19.2 |

OTHER PUBLICATIONS

MCM International Black Cat Model MH1100 Monster Wagon Owner's Manual (4 pages).

* cited by examiner

METHOD OF MAKING A DUMPING UTILITY CART

RELATED APPLICATIONS

This application is a divisional of U.S. patent application Ser. No. 10/977,254, filed Oct. 29, 2004, now U.S. Pat. No. 7,390,065, entitled DUMPING UTILITY CART, which is a divisional of U.S. patent application Ser. No. 10/395,010, filed Mar. 21, 2003, now U.S. Pat. No. 6,851,756, entitled DUMPING UTILITY CART. The entire contents of these applications are incorporated herein by this reference.

FIELD OF THE INVENTION

The invention relates generally to vehicles used for transporting and dumping articles. More particularly, the present invention relates to an improved dumping utility cart designed for cost effectively transporting and dumping articles.

BACKGROUND OF THE INVENTION

It is often desirable to transport cumbersome articles, through the use of a vehicle, from point A to point B that could not otherwise be easily transported by one or more individuals. Furthermore, it is desirable to transport and easily dump various types of particulate matter, such as dirt, loose gravel, and livestock feed as well as a multitude of other articles. Such a vehicle may function as a trailer towed behind a motorized vehicle, towed by a person, or self-propelled.

There are many forms of vehicles that have been used for carrying and dumping a variety of items. Many of which contain a relatively flat bed used to contain the articles in transit and a pivoting mechanism for slidably removing the articles from the bed to an alternate location.

Various mechanisms have been employed to transfer cumbersome cargo from the transport vehicle to another location. Manual unloading has been used. However, multitudes of pivoting mechanisms have been exploited to achieve the desired dumping. Placement of the pivot and the size of the dumping vehicle vary considerably throughout the prior art. Larger vehicles employ pneumatic cylinders and hydraulics to pivot the bed and allow for dumping of the articles transported.

Dumping carts and hinging trailers are known, including those of the following patents: U.S. Pat. No. 5,544,944 to Keech; U.S. Pat. No. 6,290,301 to Bockman; U.S. Pat. No. 3,833,263 to Jackson; U.S. Pat. No. 4,711,499 to Fortin; U.S. Pat. No. 4,889,390 to Campbell; and U.S. Pat. No. 5,395,163. The desirable elements of the present invention are neither taught nor disclosed in the prior art. The present invention is therefore a useful improvement upon the prior art of record.

SUMMARY OF THE INVENTION

A dumping utility cart of the present invention includes an article retaining bed having a front end and a rear end. The article retaining bed is pivotally attached to chassis intermediate a front set of wheels and a rear set of wheels. The front set of wheels is rotatably attached to the chassis. The rear set of wheels is rotatably attached to the article retaining bed proximal to the rear end.

When it is desired to empty the contents of the dumping utility cart a locking means is unlocked to allow the article retaining bed to pivot with respect to the chassis. The contents subsequently are released from the article retaining bed through the assistance of gravity. The article retaining bed is designed to pivot up to approximately 90° in relation to the chassis, such that the article retaining bed's surface is substantially perpendicular to that of the ground.

DETAILED DESCRIPTION OF THE PREFERRED EMBODIMENT

Figure 1:
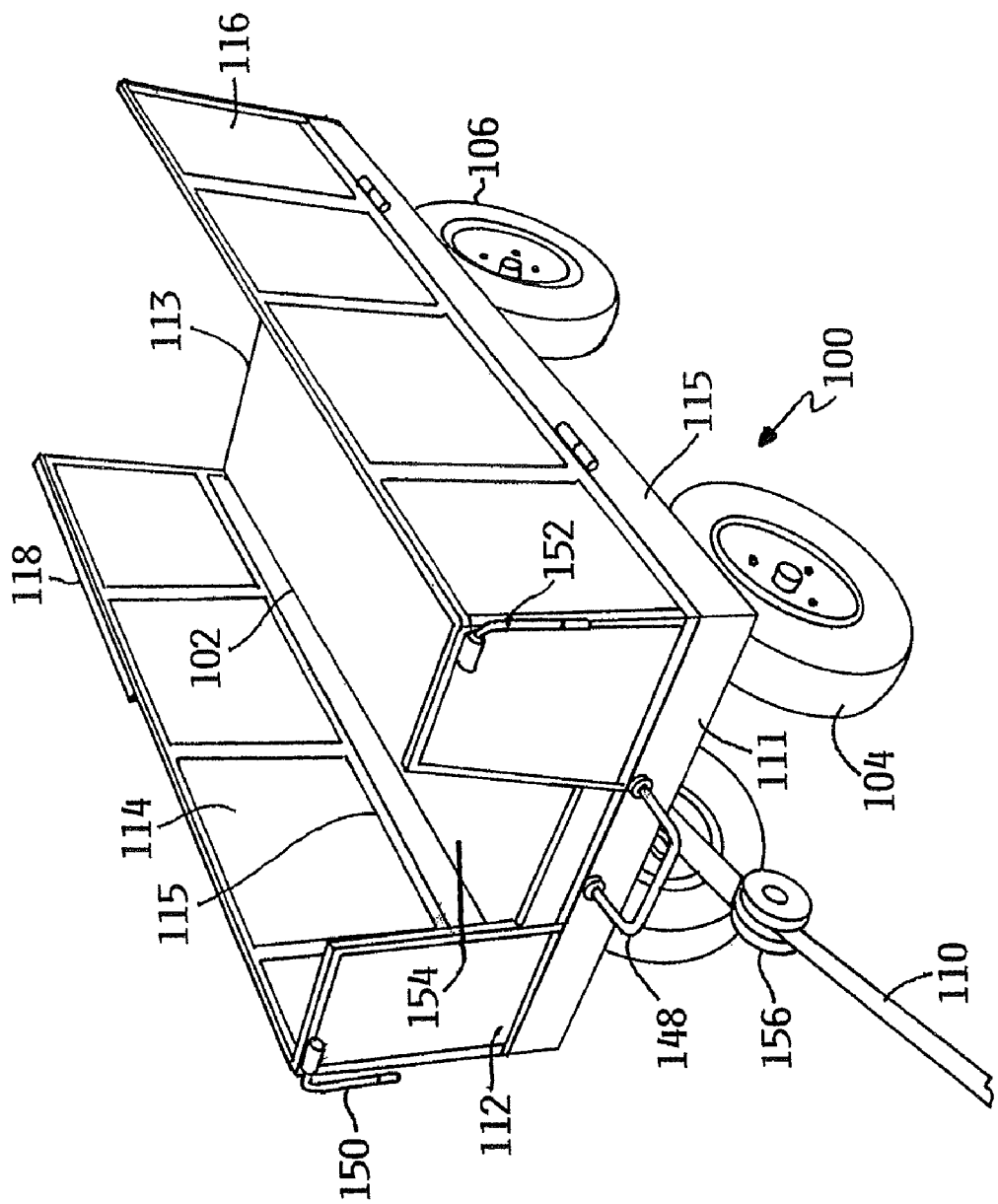
FIG. 1 is a perspective view of a dumping utility cart in a transport position.

Referring to FIGS. 1-9, a dumping utility cart of the present invention is generally designated in the drawings by the reference numeral 100. The dumping utility cart 100 contains an article retaining bed 102, a front set of wheels 104, a rear set of wheels 106, a chassis 108, and a handle 110.

The dumping utility cart 100 of the present invention enables items to be readily transported to a desired location and then removed from the dumping utility cart 100 by pivoting the article retaining bed 102 with respect to the chassis 108. Because the chassis 108 pivots at a point that is intermediate to the front set of wheels 104 and the rear set of wheels 106, the amount of force needed to pivot the article retaining bed 102 is greatly reduced when compared with prior art utility carts.

The article retaining bed 102 preferably has a generally rectangular configuration with a front end 111, a rear end 113, and a pair of sides 115 that extend between the front end 111 and the rear end 113. However, a person of ordinary skill in the art will appreciate that it is possible to use the concepts of the present invention with alternative bed configurations.

The article retaining bed 102 preferably has a substantially flat upper surface. Depending on the size of the article retaining bed 102, reinforcing beams (not shown) may be provided around an outer edge of the article retaining bed 102 or extending across a central region of the article retaining bed 102.

The article retaining bed 102 may be made of a variety of materials including but not limited to steel, aluminum, and molded composite plastic. A smooth friction-reducing surface has been found particularly well suited for the present invention. The friction-reducing surface allows for greater ease of dumping cumbersome articles contained within the dumping utility cart 100.

Figure 2:
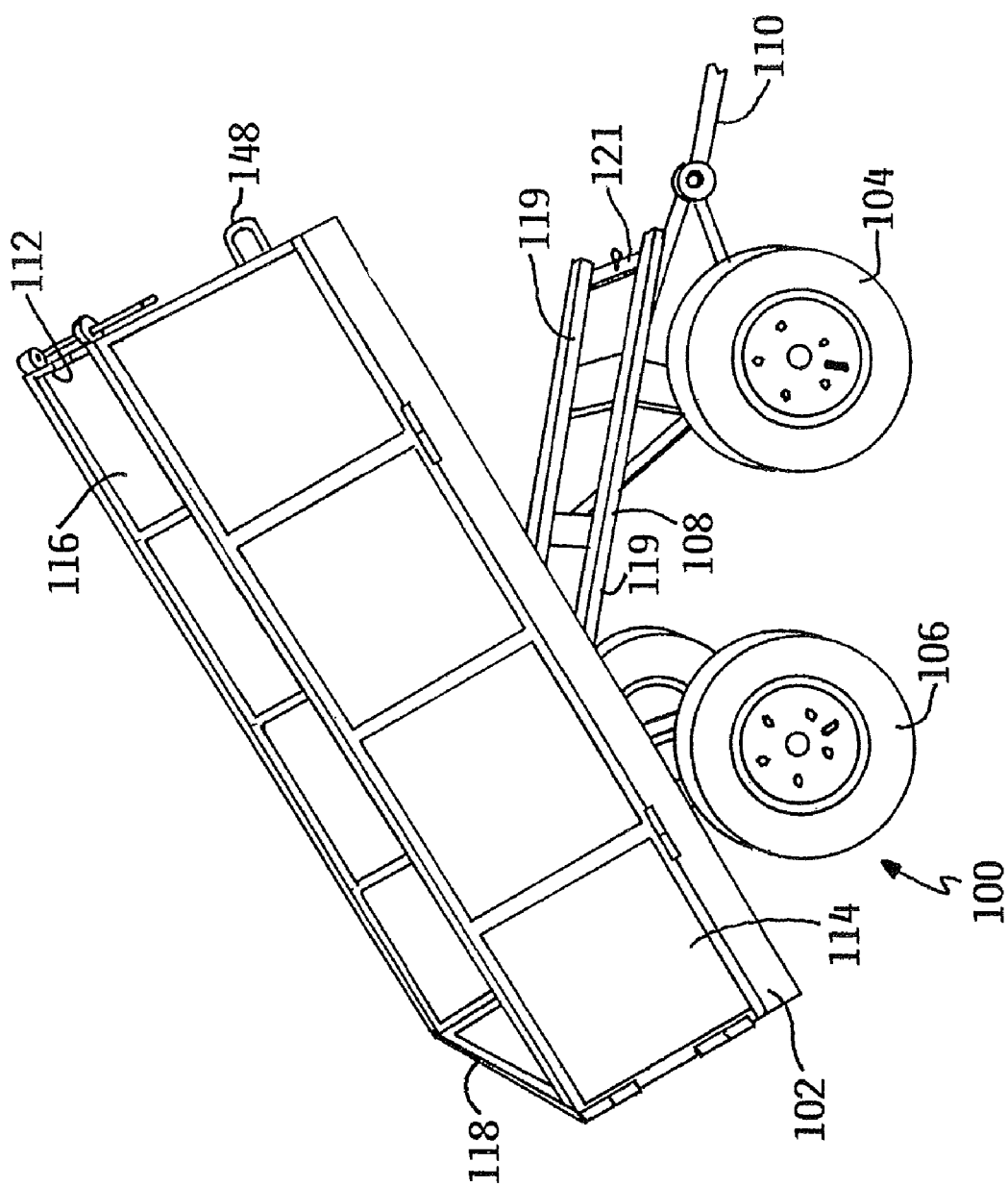
FIG. 2 is a side view of the dumping utility cart in a partially raised position.
Figure 3:
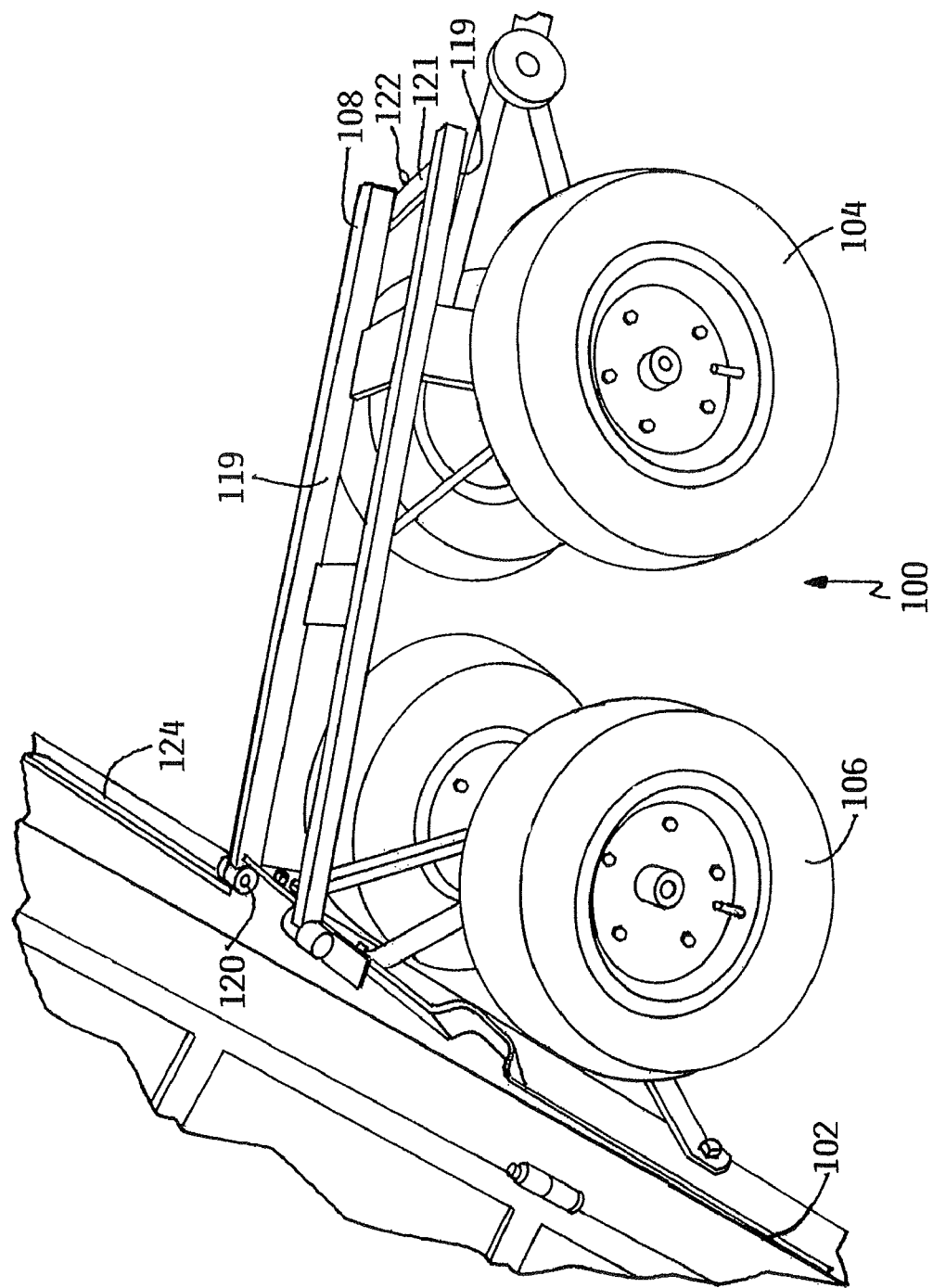
FIG. 3 is a side view of the dumping utility cart in a fully raised position.

The chassis 108 preferably includes a pair of side rails 119 and a plurality of braces 121 that extend between the side rails 119, as most clearly illustrated in FIGS. 2 and 3. The configuration of the side rails 119 and the braces 121 is selected based upon the anticipated load that is to be carried by the dumping utility cart 100. The article retaining bed 102 is connected to the chassis 108 at pivot point 120 and at locking point 122. The pivot point 120 is located at an end of each side rail 119.

The chassis 108 is pivotally connected to the article retaining bed 102 for greater ease of dumping cumbersome articles. Proper positioning of the pivot in relation to the sets of wheels 104,106 and the article retaining bed 102 will better enable a person to use the dumping utility cart 100. When properly positioned, the rear wheels 106 rotate under the article retaining bed 102 in the manner similar to that of a fulcrum.

By acting in this manner a relatively small amount of upward force may be employed to pivot the article retaining bed 102. As shown in FIG. 2, the pivot assisting handle 148 is employed to pivot the article retaining bed 102 and initiate the dumping process. In the process of dumping the wheel base decreases in length as a result of the pivot.

Figure 5:
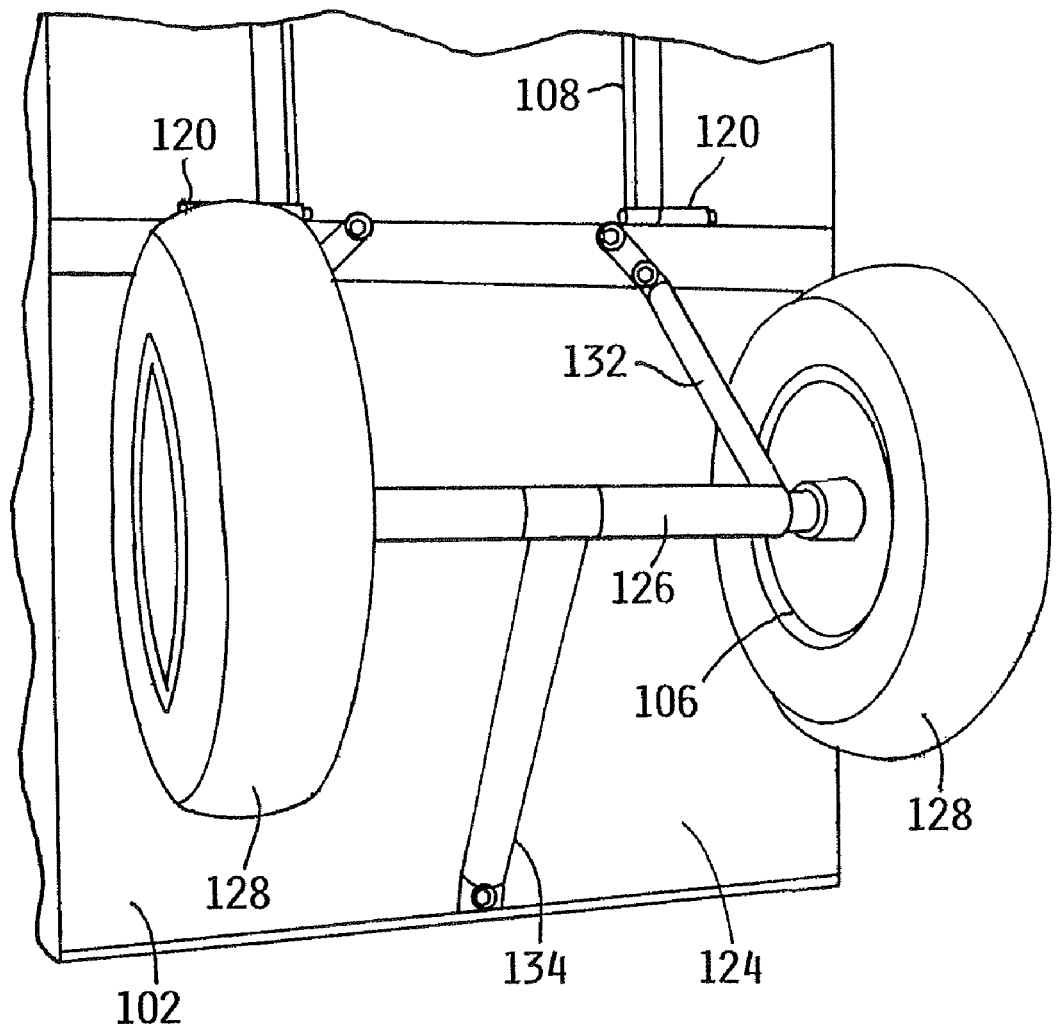
FIG. 5 is a bottom view of a rear set of wheels.

The rear set of wheels 106 are rotatably attached to the underside 124 of the article retaining bed 102, as most clearly illustrated in FIG. 5. In the preferred embodiment, the rear wheels 106 rotate about a rear axle 126. The length of the rear axle 126 is preferably less than the width of the article retaining bed 102. Tires 128 with inflatable inner tubes (not shown) have been found to be particularly well suited for use as the rear wheels 106.

To increase stability and durability, the rear wheels 106 are fixedly attached to the underside 124 of the article retaining bed 102 by at least one forward brace 132, at least one rear brace 134 and at least one intermediate brace 137.

The forward braces 132 extend from the rear axle 126 to the underside 124 of the article retaining bed 102 proximate the pivot point 120 at an angle of approximately 45 degrees. The at least one rear brace 134 extends from the rear axle 126 to the underside 124 of the article retaining bed 102 proximate the rear end 113 at an angle of approximately 45 degrees. The intermediate brace 137 extends substantially perpendicular from the underside 124 of the article retaining bed 102 to the rear axle 126.

Figure 6:
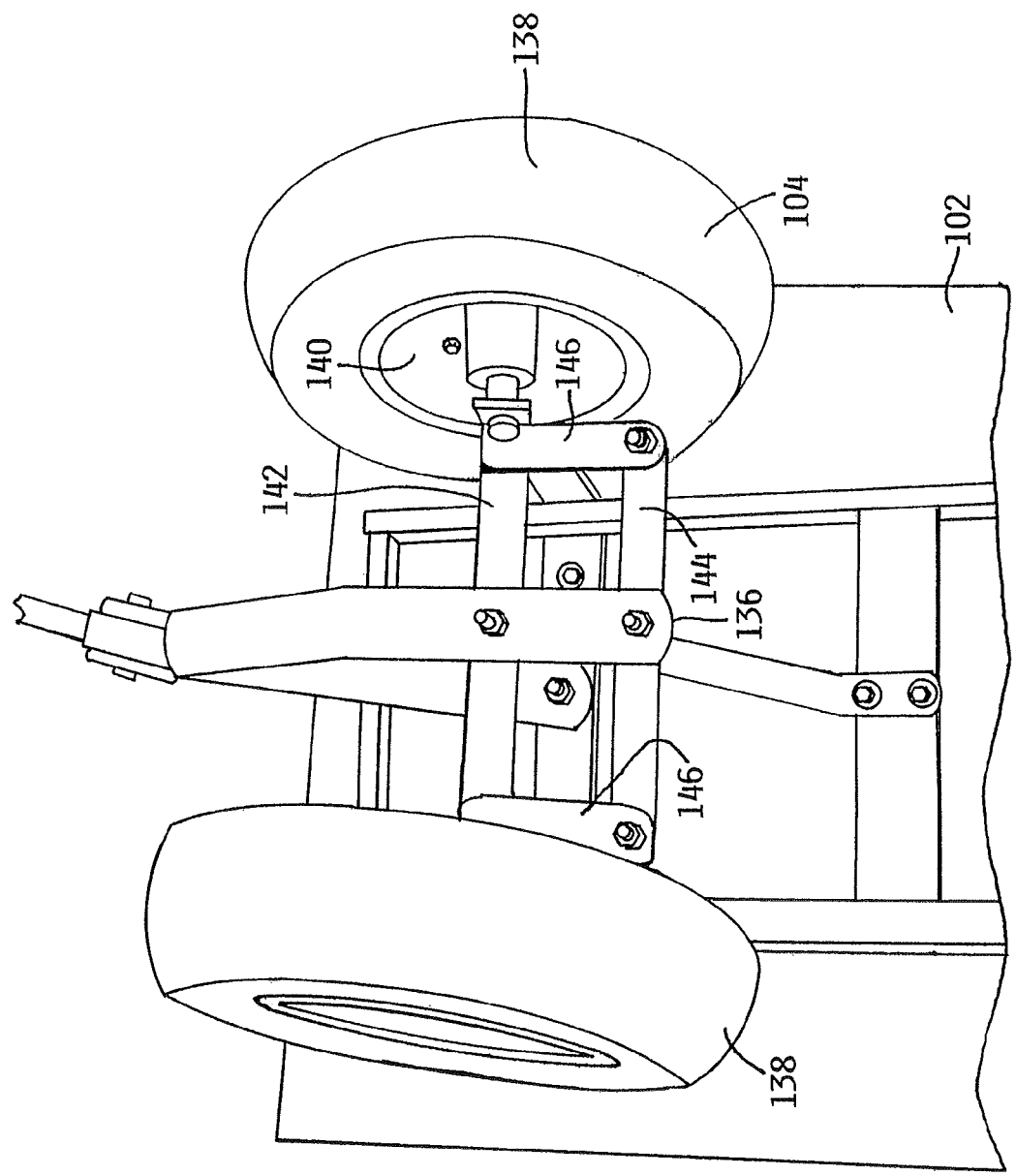
FIG. 6 is a bottom view of a front set of wheels.
Figure 7:
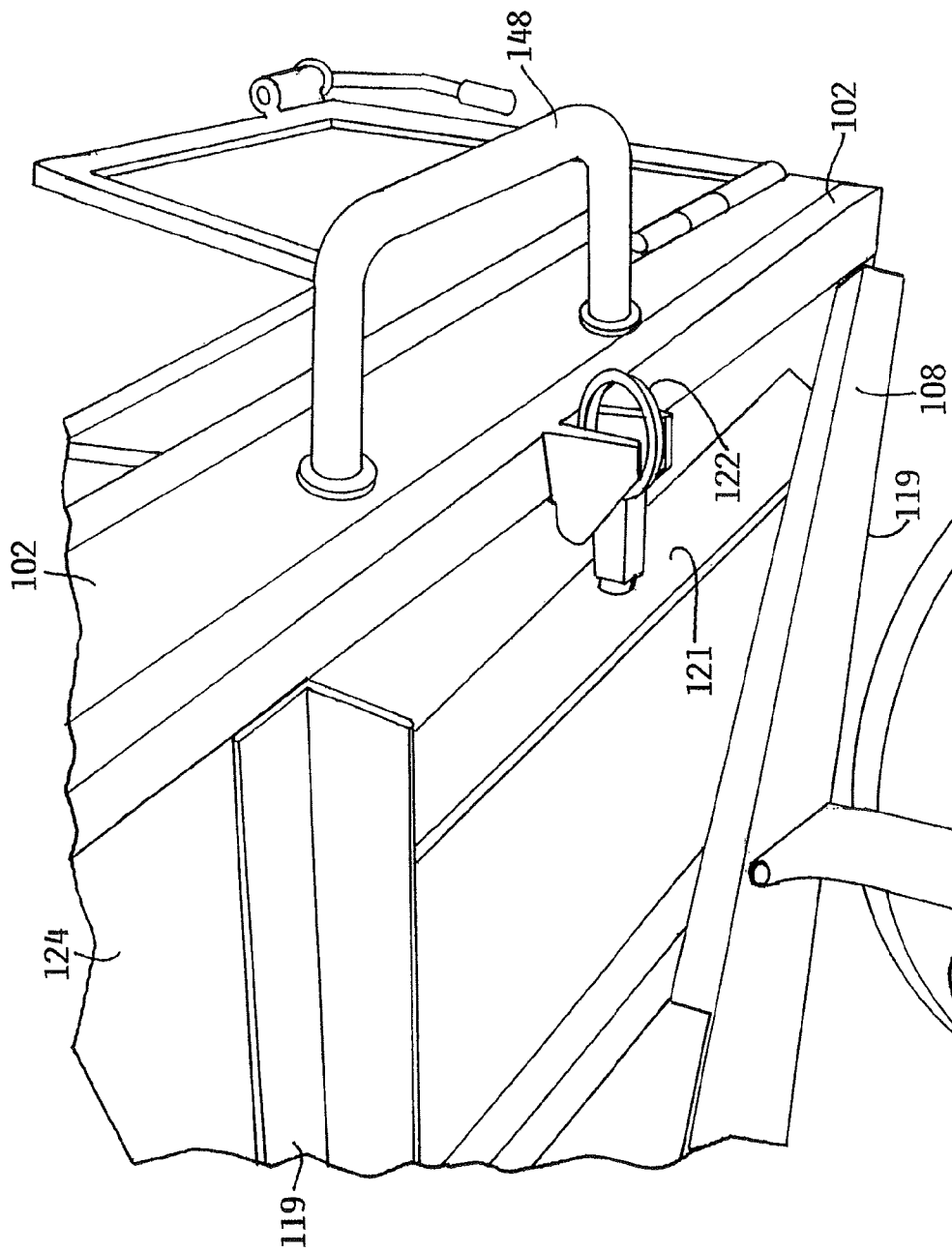
FIG. 7 is a perspective view of a first locking means.

The front set of wheels 104 are operably attached to the chassis 108, as most clearly illustrated in FIG. 6. The front set of wheels 104 comprises inflatable tires 138 and rims 140. The front set of wheels 104 are rotatably attached to a navigating mechanism 136. Pivotally attached to the navigating mechanism 136 is the navigating handle 110.

The navigating mechanism 136 comprises an axle bar 142, a pivot bar 144, and a set of connector bars 146. The handle 110 is pivotally attached to the axle bar 142, the pivot bar 144, and the chassis 108. The handle 110 may include a detachable mechanism 145 that permits the handle 110 to either be pulled by hand or attached to a tractor using a clevis. The connector bars 146 are parallel to the direction of travel and pivotally attached to the axle bar 142 and the pivot bar 144.

The connector bars 146 are proximal to the front wheels 104. The axle bar 142 is located in the axis of rotation for the front wheels 104 and is fixedly attached to the chassis 108 proximal to the front set of wheels 104.

To increase the capacity of the dumping utility cart 100, the article retaining bed 102 preferably has a front end wall 112, a pair of opposing side walls 114, 116, and a rear end wall 118. The front end wall 112, the side wall 114, 116 and the rear end wall 118 are preferably pivotable between an upwardly extending orientation (illustrated in FIG. 1) and a downwardly extending orientation (illustrated in FIG. 9).

The front end wall 112 is preferably pivotally attached to the article retaining bed 102. The front end wall 112 spans the width of the cart 100. A navigating handle slot 154 is preferably cutout of the front end wall 112 to allow downward pivot of the front end wall 112 while maintaining substantially free movement of the navigating handle 110. Positioned beneath the front end wall 112 on the front end of the dumping utility cart 100, equidistant from the ends of the article retaining bed 102, is a pivot assisting handle 148, as most clearly illustrated in FIG. 7.

Side walls 114, 116 are preferably pivotally attached to the article retaining bed 102. The side walls 114, 116 may also be fixedly attached to the front end wall 112 by wall connectors 150, 152.

Figure 8:
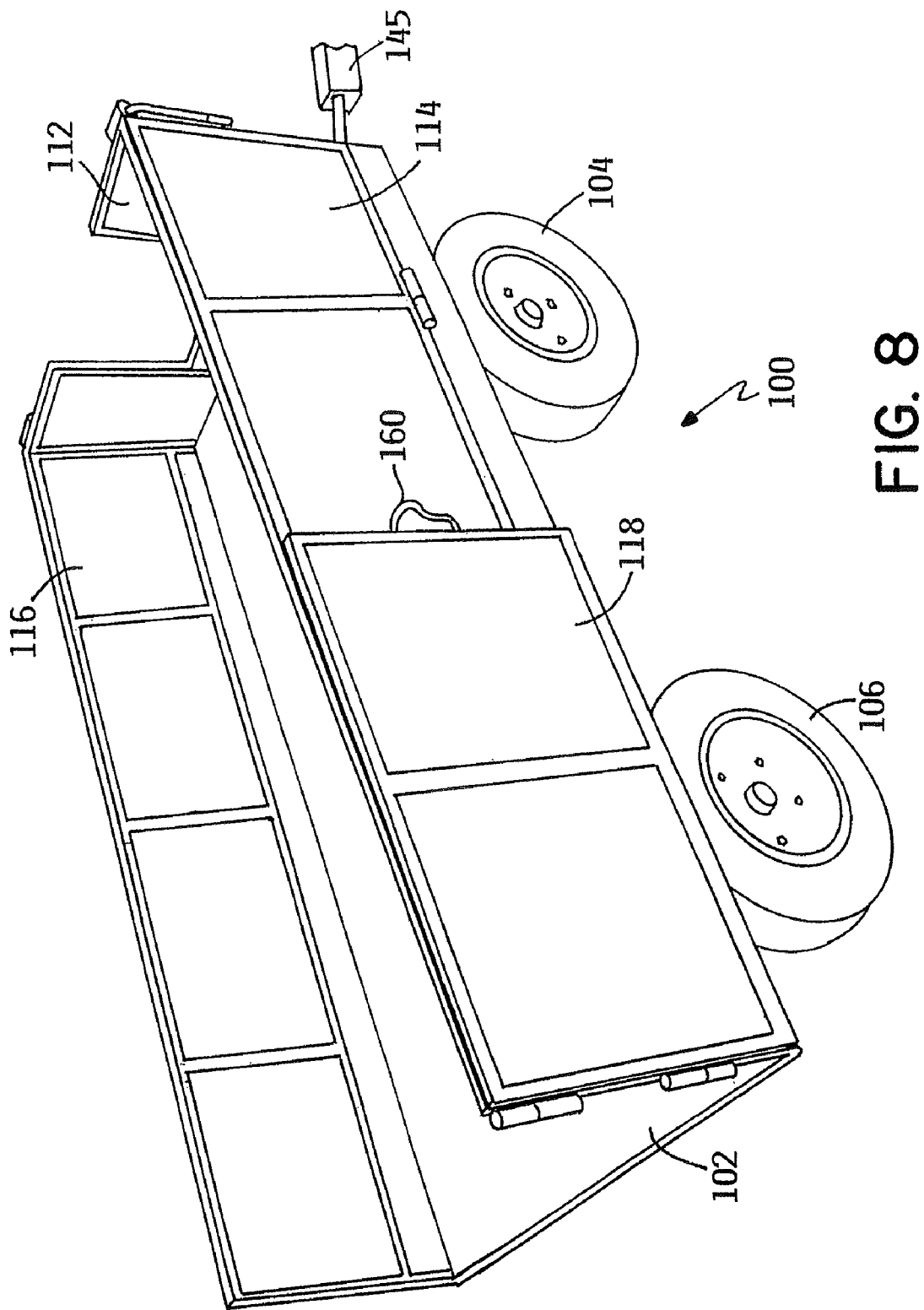
FIG. 8 is a perspective view of the dumping utility cart with the end wall engaged by a second locking means.
Figure 9:
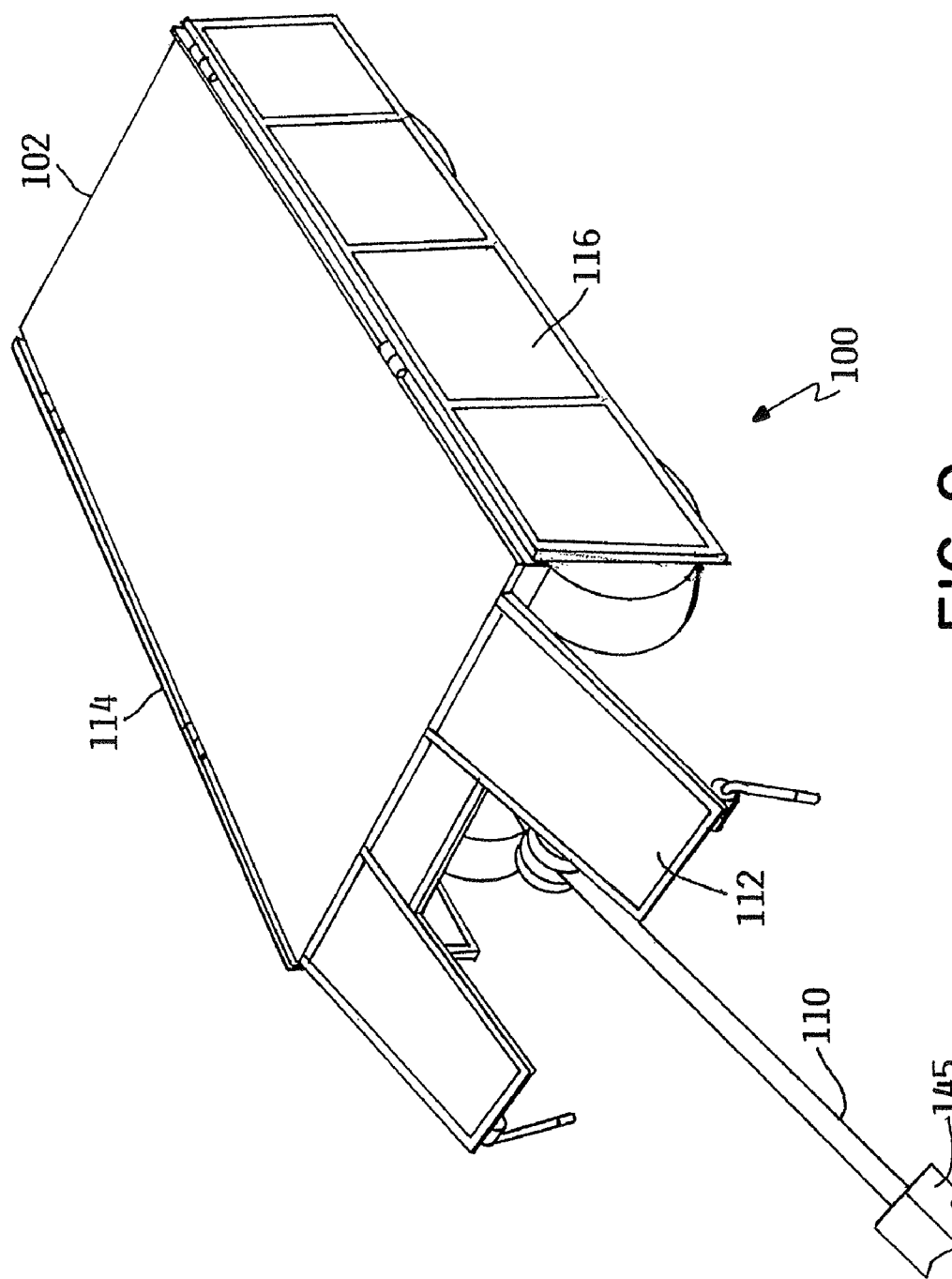
FIG. 9 is a perspective view of the dumping utility cart with side and end walls in downward position.

The rear end wall 118 is preferably pivotally attached to one of the side walls 114. The rear end wall 118 may also be pivotally attached to the article retaining bed 102. FIGS. 1 and 8 illustrate the rear end wall 118 in a locked position parallel with side wall 114. Various locking mechanisms may be employed. A frictionally engaging cotter pin 160 has been found particularly well suited for the locking means.

Through the use of wall connectors 150, 152 the front end wall 112 and side walls 114, 116 act as mutual support members. A number of mechanical devices may be employed as the wall connectors 150, 152, including but not limited to cotter pins, frictionally engaging hooks, and ball and socket joints.

The dumping utility cart 100 may be positioned through the use of the handle 110. The handle 110 is pivotally attached to the navigating mechanism 136. This connection allows for the user to easily turn and navigate the dumping utility cart 100, as the front set of wheels 104 turn in unison through the deployment of the navigating mechanism 136. The pivotal attachment 156 allows for users of various height and arm length to navigate the dumping utility cart 100 with greater comfort and ease.

In operation, the handle 110 is used to move the dumping utility cart 100 to a desired location. As the dumping utility cart 100 is being moved, the first set of wheels rotate about a first axis and the second set of wheels rotate about a second axis.

Figure 4:
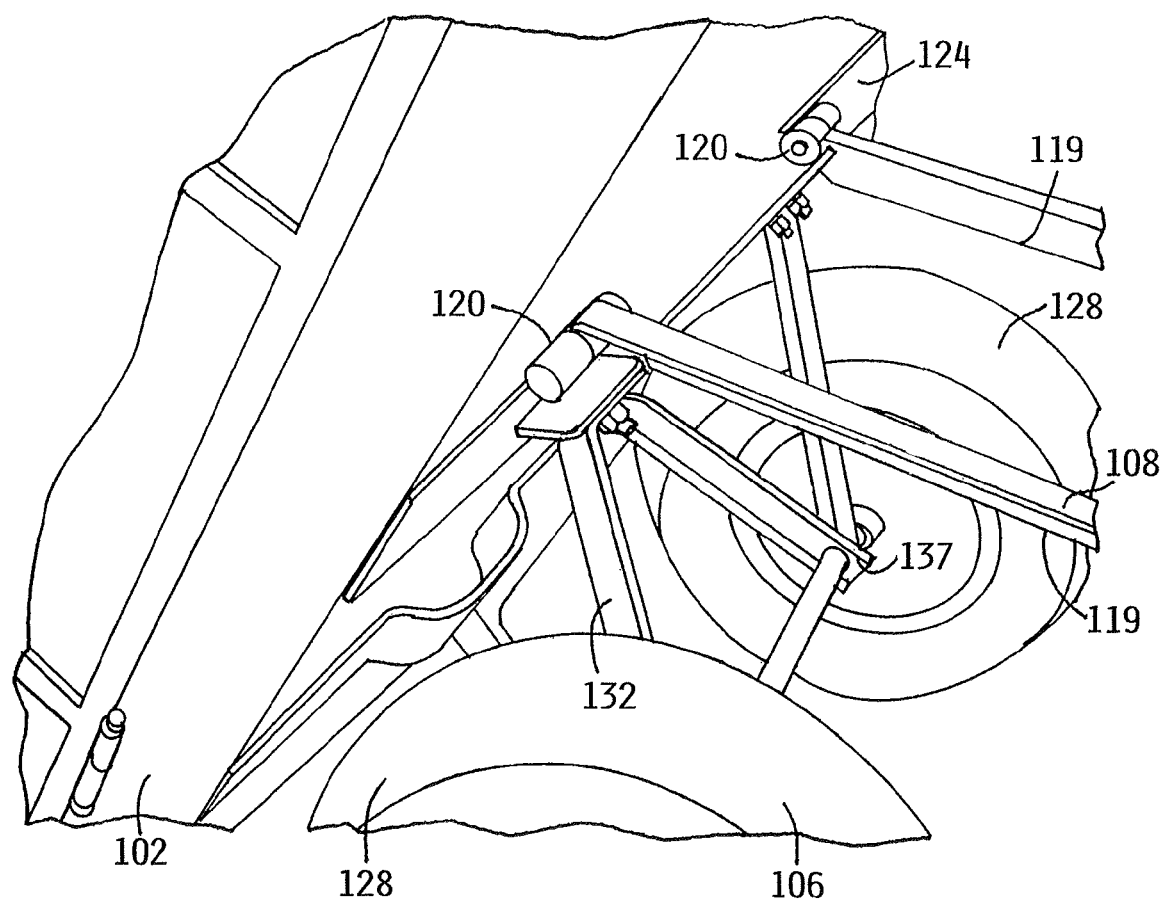
FIG. 4 is a close-up view of the dumping utility cart as shown in FIG. 3.

An individual may dump a load of material by first unlocking the locking means at lock point 122. After this disengagement an upward force exerted upon the pivot assisting handle 148 will initiate the dumping operation by pivoting the article retaining bed 102 about a third axis. An upward force may be exerted up to the point in which the article retaining bed 102 is substantially perpendicular to the ground, as shown in FIGS. 3 and 4.

In the pivoting process, the third axis is moved from a location outside the first axis and the second axis to a position that is between the first axis and the second axis. As a result of this configuration, the amount of force needed to dump the dumping utility cart 100 is significantly reduced when compared to prior art utility carts.

The preferred embodiment of the present invention has been set forth in FIGS. 1-9 and the specification. Although specific terms have been utilized, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

In an alternative embodiment not shown, the chassis may be pivotally connected to the article retaining bed at two positions. The first position being the same as described in the preferred embodiment. The second position would be proximal to the opposite end as the first position. The existence of two pivot points has a number of advantages. One being that the user may choose which end to pivot above the other end by unlocking the end opposite to where they wish to dump the load contained in the bed. Additionally, the bed may be easily removed from the chassis by unlocking each of the pivot points.

The invention claimed is:

1. A method of making a dumping cart comprising:
   forming a chassis;
   operably coupling a front set of wheels to the chassis;
   forming an article retaining bed;
   operably coupling a rear set of wheels to the article retaining bed; and
   pivotally coupling the chassis to the article retaining bed along an articulation axis wherein the articulation axis is pivotable between a carry orientation intermediate the set of front wheels and the set of rear wheels when the cart is in a carry disposition and a dump orientation wherein the rear set of wheels is intermediate the articulation axis and the set of front wheels when the cart is in a dump disposition.

2. The method of claim 1 further comprising integrating a locking means for maintaining the article retaining bed in a lowered position with respect to the chassis.

3. The method of claim 2 further comprising attaching a pulling means to the chassis.

4. The method of claim 3 further comprising operably coupling the locking means and the pulling means.

5. The method of claim 1 further comprising bracing the rear set of wheels with a front brace and a rear brace.

6. A method of making a dumping cart comprising:
   forming an article retaining bed and an articulated chassis;
   operably coupling a front set of wheels to the articulated chassis and a rear set of wheels to the article retaining bed;
   shiftably coupling the article retaining bed and articulated chassis along an articulation axis wherein the articulation axis is shiftable between a carry orientation intermediate the set of front wheels and the set of rear wheels when the cart is in a carry disposition and a dump orientation wherein the rear set of wheels is intermediate the articulation axis and the set of front wheels when the cart is in a dump disposition.

7. The method of claim 6 further comprising forming a locking means for maintaining the article retaining bed in a lowered position with respect to the articulated chassis.

8. The method of claim 7 further comprising attaching a handle to the article retaining bed.

9. The method of claim 8 further comprising operably coupling the locking means and the handle.

10. The method of claim 6 further comprising bracing the rear set of wheels with a front brace and a rear brace.

11. A method of making a dumping cart comprising:
    forming a first axle and a second axle;
    attaching a first set of wheels to the first axle and fastening the first axle to an article retaining bed;
    connecting a second set of wheels to the second axle and fastening the second axle to a chassis, thus defining a separation distance between the first axle and the second axle; and
    rotatably coupling the chassis and the article retaining bed to allow the separation distance to vary between a first separation distance when the cart is in a carry disposition and a lesser second separation distance when the cart is in a dump disposition.

12. The method of claim 11 further comprising integrating a locking means for maintaining the article retaining bed in a lowered position with respect to the chassis.

13. The method of claim 12 further comprising attaching a pulling means to the chassis.

14. The method of claim 13 further comprising operably coupling the locking means and the pulling means.

15. The method of claim 11 further comprising bracing the first axle with a plurality of braces.

16. A method of making a dumping cart comprising:
    forming a chassis and attaching a front set of wheels to the chassis at a first axle;
    assembling an article retaining bed and attaching a rear set of wheels to the article retaining bed at a second axle; and
    pivotally coupling the chassis to the article retaining bed at a pivot axis wherein the pivot axis is pivotable between a first orientation intermediate the first axle and second axle when the cart is in a carry disposition and a second orientation wherein the second axle is intermediate the axis and the first axle when the cart is in a dump disposition.

17. The method of claim 16 further comprising bracing the rear set of wheels with a plurality of braces.

18. The method of claim 16 further comprising attaching a handle proximate the first axle.

19. The method of claim 18 further comprising incorporating a locking means into the article retaining bed.

20. The method of claim 18 further comprising coupling the locking means and the handle.

* * * * *